United States Patent [19]

Grawey et al.

[11] Patent Number: 5,279,378

[45] Date of Patent: Jan. 18, 1994

[54] FRICTIONALLY DRIVEN BELTED WORK VEHICLE

[75] Inventors: Charles E. Grawey; Robert J. Grob; Cullen P. Hart, all of Peoria, Ill.

[73] Assignee: Caterpillar Inc., Peoria, Ill.

[21] Appl. No.: 938,685

[22] Filed: Dec. 3, 1986

Related U.S. Application Data

[63] Continuation-in-part of Ser. No. 563,338, Dec. 20, 1983, abandoned.

[51] Int. Cl.$^5$ .................... B62D 55/04; B62D 55/30
[52] U.S. Cl. .................... 180/9.21; 305/13; 305/35 EB
[58] Field of Search .............. 180/9, 9.1, 9.21, 9.36, 180/10; 305/11, 13, 35R, 35EB, 38, 24, 27, 28

[56] References Cited

U.S. PATENT DOCUMENTS

| 1,297,104 | 3/1919  | Colahan         | 305/27     |
|-----------|---------|-----------------|------------|
| 2,338,817 | 1/1944  | Mayne           | 305/13     |
| 2,350,076 | 5/1944  | Smith et al.    | 305/38     |
| 2,992,863 | 7/1961  | Fredricks et al.| 305/13     |
| 2,998,998 | 9/1961  | Hyler et al.    | 305/35 EB  |
| 3,107,128 | 10/1963 | Ruane           | 305/35 EB  |
| 3,113,805 | 12/1963 | Nodwell         | 305/35 EB  |
| 3,703,321 | 11/1972 | Schoonover      | 305/38     |
| 4,198,103 | 4/1980  | Ward et al.     | 305/35 EB  |
| 4,269,457 | 5/1981  | Farrior         | 305/11     |
| 4,449,627 | 5/1984  | Kell            | 305/35 EB  |
| 4,449,756 | 5/1984  | Weeks           | 305/11     |
| 4,537,267 | 8/1985  | Satzler         | 180/9.1    |

FOREIGN PATENT DOCUMENTS

| 678785   | 6/1939  | Fed. Rep. of Germany ... 305/35 EB |
| 1427191  | 12/1965 | France ........................ 305/35 EB |
| 278779   | 10/1927 | United Kingdom .......... 305/35 EB |
| 1028059  | 5/1966  | United Kingdom ................. 305/38 |

Primary Examiner—Margaret A. Focarino
Assistant Examiner—Kevin Hurley
Attorney, Agent, or Firm—Claude F. White

[57] ABSTRACT

An elastomeric belt laying vehicle is disclosed for transmitting greater tractive effort to the earth as compared to comparably powered wheel vehicles and being operable at high speed on improved road surfaces without inflicting damage thereto. A pair of the wheels are arranged on each lateral side of the vehicle's chassis for support thereof. An inextensible, endless belt is highly tensioned throughout its length, is entrained about each pair of wheels, and is frictionally, drivingly coupled to at least one wheel of each pair. The structure of the belt, structure of the wheels and cooperating components thereof ensure engagement therebetween, provides long service with minimum maintenance thereof, and supplies the necessary frictional couple to effectively transmit driving torque from the wheels to the belt.

46 Claims, 9 Drawing Sheets

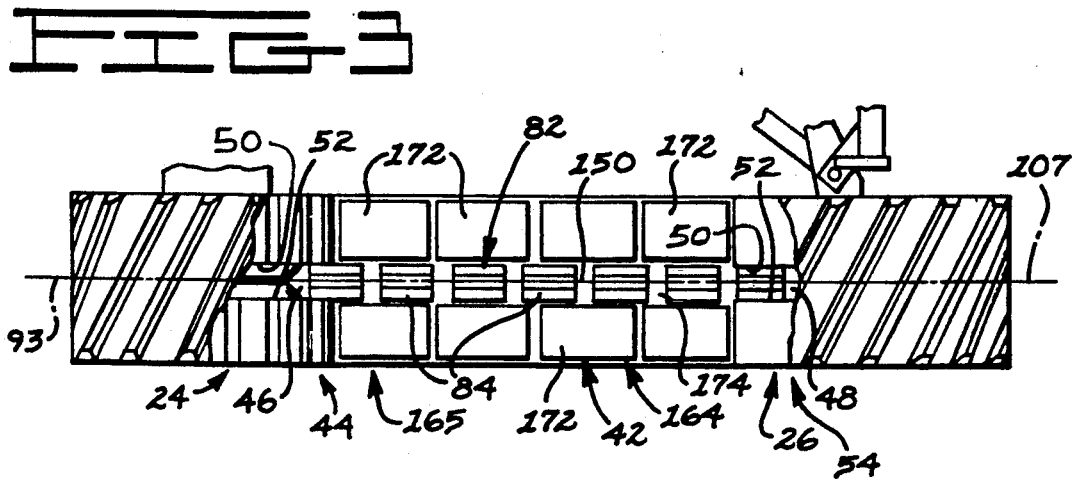

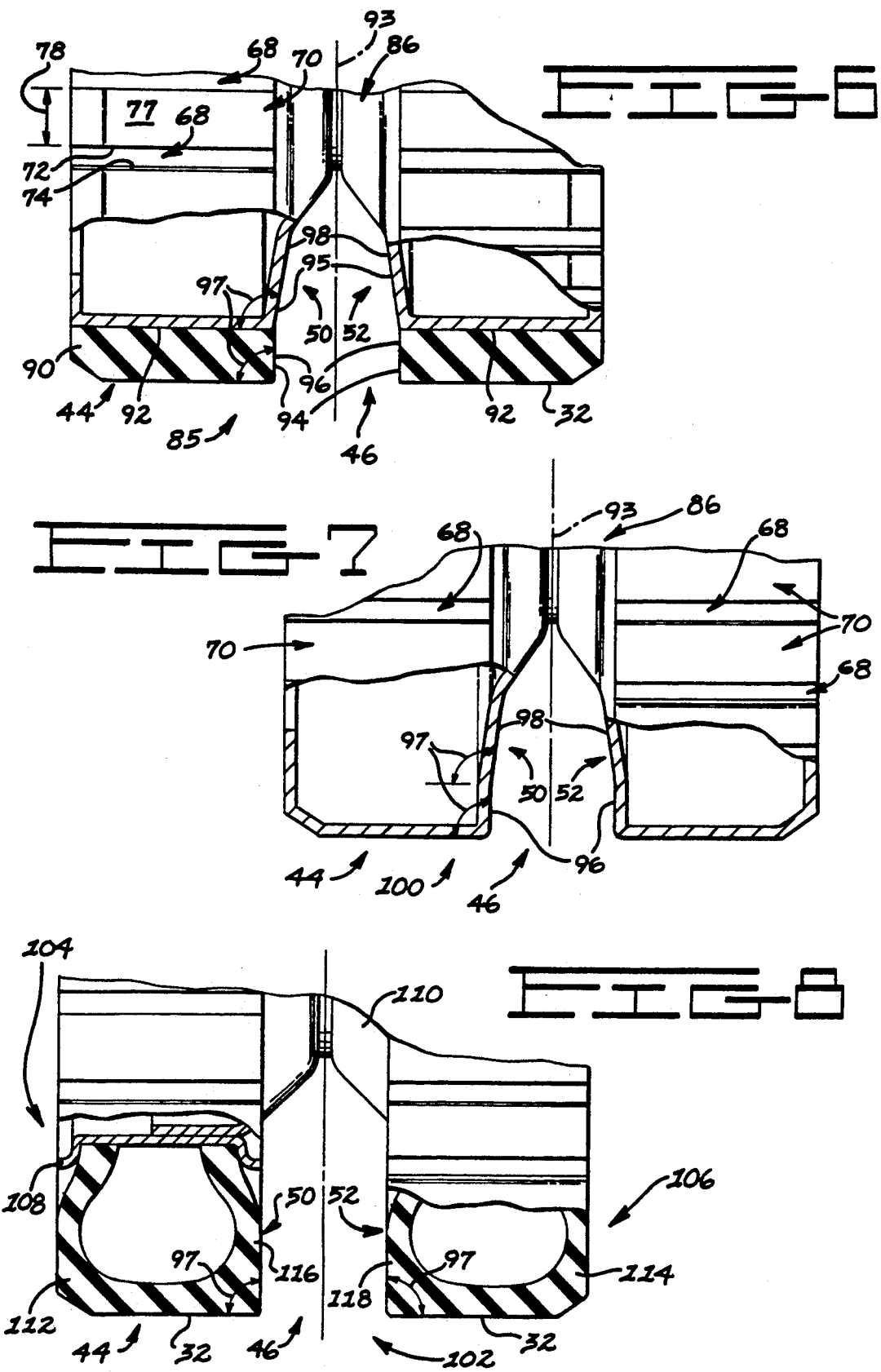

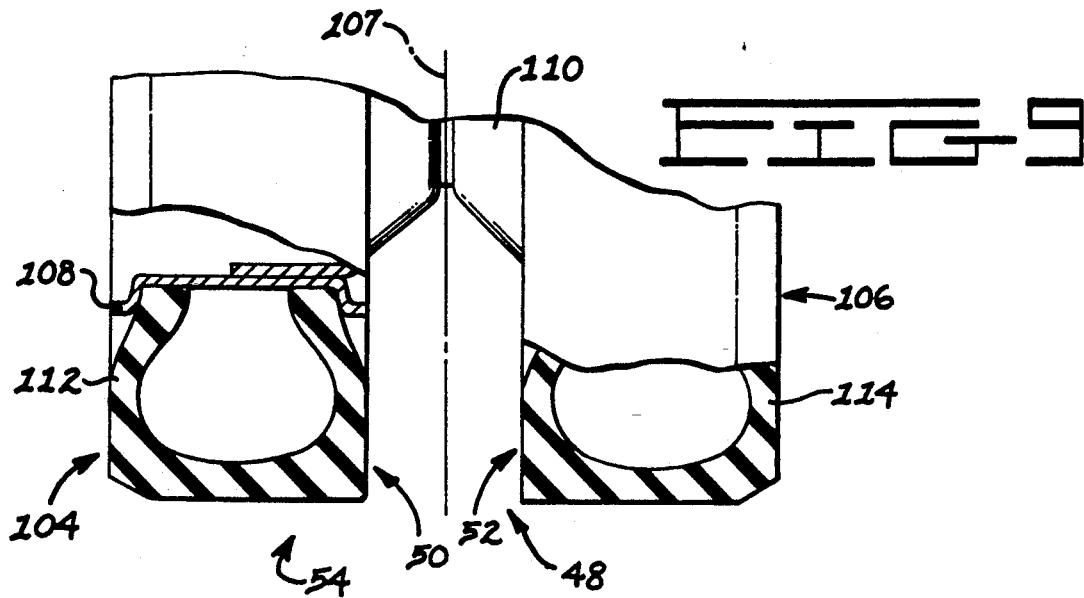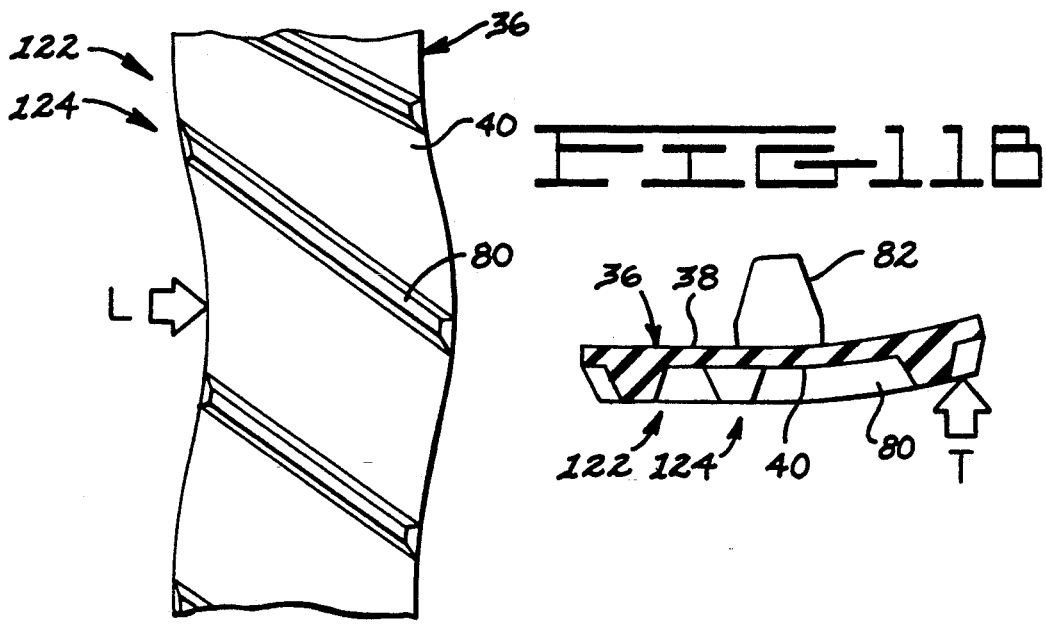

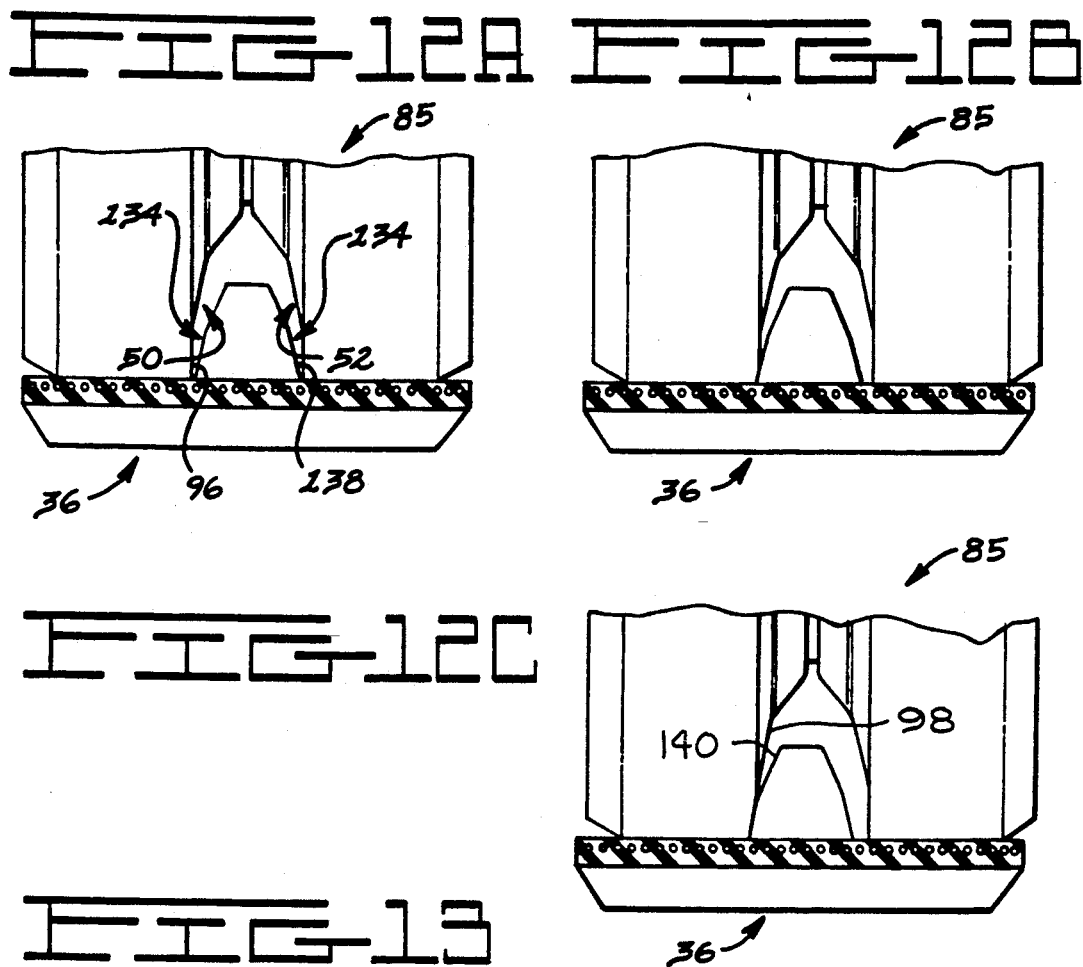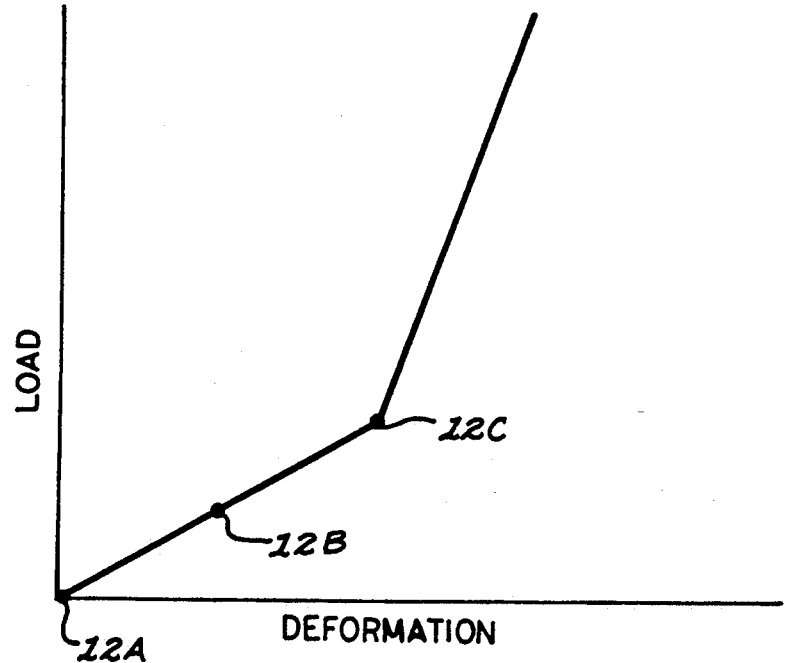

A < B

C = B

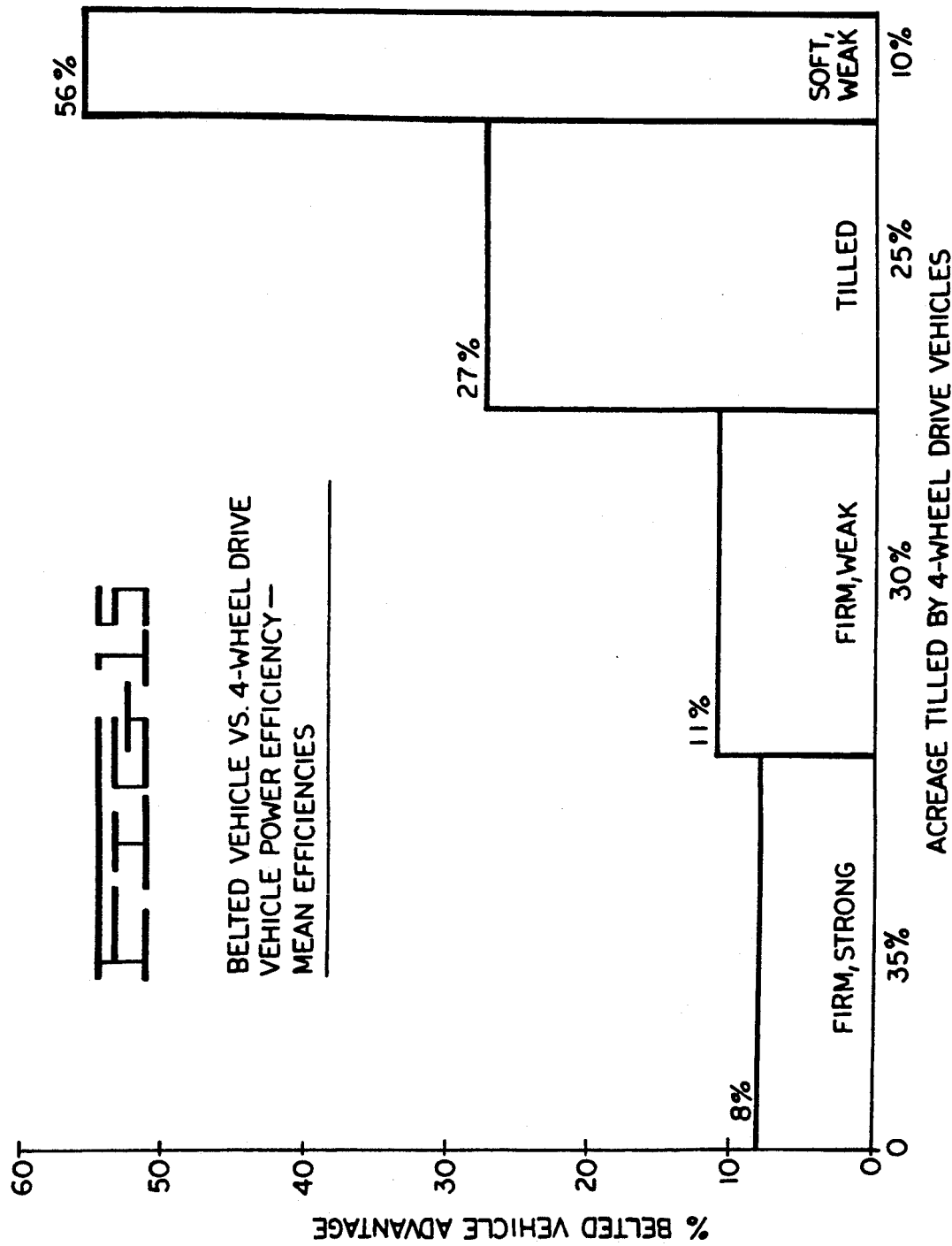

FRICTIONALLY DRIVEN BELTED WORK VEHICLE

This is a continuation-in-part of Ser. No. 563,338, filed Dec. 20, 1983, now abandoned.

TECHNICAL FIELD

This invention relates to crawler-type vehicles, tractors or equipment having tracks over wheels for providing both ground support and tractive effort, and more particularly, to a system for frictionally transmitting motive force through an interface between a wheel and a ground engaging belt.

BACKGROUND ART

It has long been recognized that vehicles having ground engaging/propulsion systems which utilize track have higher traction in soil and cause less ground compaction than vehicles of comparable weight equipped with propulsion systems utilizing solid or pneumatic-tire-equipped wheels. The "footprint" or engagement area of track propulsion systems with the ground is larger than the footprint which is practically achievable by wheel propulsion systems due to the footprint of each wheel being relatively small. In an attempt to compensate for such reduced footprint, large wheel vehicles such as agricultural tractors often have four and sometimes six wheels mounted on each axle. Propulsion systems for agricultural applications today, however, nearly exclusively utilize pneumatic tires rather than track. Present day efforts to increase traction and reduce soil compaction have centered around optimizing wheel propulsion systems even though track systems inherently provide such objectives. As stated in the Agricultural Engineer, Winter 1982 Edition, page 109, "Now that the pneumatic tyre provides the almost universal means of obtaining traction in agriculture, it is timely to incorporate a system of in-work tyre pressure control which will enable tyre deflection levels to be kept constant throughout the working cycle. The quest for increased traction with reduced levels of soil compaction makes the adoption of such a system increasingly desirable."

The popularity and nearly universal acceptance of wheel propulsion systems rather than track systems in agricultural use stems primarily from the present day track system's relatively higher noise levels, higher initial cost, lower maximum travel speed, and inability to transport itself on improved road surfaces without inflicting unacceptable damage. While the noise level and roading problems exhibited by conventional track may be minimized by cushioning the ground engaging surface thereof, commercially unacceptably high wear rates generally occur at the moveable joints between the rigid track sections when such conventional track is used in high speed applications.

Those skilled in the art have recognized that the foregoing advantages of wheel and track propulsion systems could be realized by utilizing a propulsion system in which a continuous rubber belt is entrained about a pair of wheels. Problems encountered in actually reducing such belt system to practice include how to drive such belt with the entrained wheels, how to maintain structural integrity of the belt and wheels, how to retain the belt in lateral alignment with the wheels when the wheels are subjected to large lateral loads, how to provide long life for the belt and wheels, and how to accommodate debris ingestion between the wheels and belt while maintaining the driving relationship therebetween without damaging either.

Limited success has been achieved in providing belt systems for some light duty applications such as snowmobiles. Light duty belt systems utilizing positive drives are illustrated, by example, in U.S. Pat. Nos. 3,510,174 and 3,858,948 which issued May 5, 1970 and Jan. 7, 1975, respectively. An example of a light duty vehicle utilizing friction drive is illustrated in U.S. Pat. No. 4,198,103 which issued Apr. 15, 1980. Attempts to expand the use of belt systems to heavy-duty commercial applications have, in general, met with failure. The following U.S. patents are directed toward resolving the previously described belt system problems by utilizing positive belt drives and applying them to heavy-duty applications: U.S. Pat. No. 2,338,817 which issued Jan. 11, 1944; U.S. Pat. No. 2,461,849 which issued Feb. 15, 1949; U.S. Pat. No. 3,703,321 which issued Nov. 21, 1972; and U.S. Pat. No. 4,241,956 which issued Dec. 30, 1980. The '849 patent which is assigned to B. F. Goodrich explained why positive drive was preferred over others: "It has also been proposed to eliminate the use of cross bars and to drive the track by friction alone, but use of such a construction requires a great area of angular contact or 'wrap' about the driving wheel and confines the use of such tracks to drives for light vehicles providing great angular contact of the drive wheel."

Notwithstanding the '849 recommendation, still other U.S. patents sought to apply friction drive to heavy-duty applications: U.S. Pat. No. 2,476,828 issued Jul. 19, 1949; U.S. Pat. No. 2,476,460 issued Jul. 19, 1949; U.S. Pat. No. 2,998,998 issued Sep. 5, 1961; U.S. Pat. No. 1,411,523 issued Apr. 4, 1922; U.S. Pat. No. 2,537,745 issued Jan. 9, 1951; U.S. Pat. No. 2,531,111 issued Nov. 21, 1950; U.S. Pat. No. 2,494,065 issued Jan. 10, 1950; U.S. Pat. No. 2,429,242 issued Oct. 21, 1947; U.S. Pat. No. 2,350,076 issued May 30, 1944; U.S. Pat. No. 2,898,965 issued Aug. 11, 1959; U.S. Pat. No. 2,644,539 issued Jul. 7, 1953; U.S. Pat. No. 3,369,622 issued Feb. 20, 1968; and U.S. Pat. No. 4,281,882 issued Aug. 4, 1981. Other friction drive systems are shown in Otter Tractor Corporation advertising circular, U.K. Patent 1,604,615 published Dec. 9, 1981; U.K. Patent 2,048,800B published Jan. 12, 1983; U.K. Patent 278,779 published Oct. 20, 1927; Netherlands Patent 7,605,810 published Nov. 30, 1977; and German Patent 678,785 granted Jun. 29, 1939. Many of the aforementioned friction drive systems have a dual purpose driving/guiding structure which utilizes a driving slot having sloped lateral facing side surfaces and a belt having cooperatively sloped, laterally facing side surfaces which are frictionally engaged with the slot's side surfaces through an interference fit similar to V-belt drives. The driving slots of such structures tend to accumulate debris which disengages the frictionally engageable side surfaces. Radial grooves in the walls bounding such slots have been used in attempts to expel debris from the slots but have been generally ineffective.

The aforementioned patents are representative of a large body of patents which purport to solve one or more of the belt system implementation problems. Such body of patents constitutes documentary evidence that efforts to achieve this blend of track and wheel propulsion systems have been exerted for over half a century without realizing any practical measure of success. Solutions to the problems of actually implementing a heavy-duty vehicular belt drive system have proven ellusive and scientific scaling techniques have not, to date, been successfully applied to light duty vehicles for purposes of developing a heavy-duty belt system. Thus, despite the long felt need for and the advantages thereof, a heavy-duty application vehicle utilizing such belt system is commercially unavailable today.

It is, thus, the objective of this invention to provide a workable solution to the problems by taking into account that such vehicle's undercarriage, to be truly useful, should be roadable, provide high traction and low ground compression, and minimally disturb the underlying terrain, as well as operate in the heavy-duty working mode and provide a smooth ride for the operator in most soil conditions and topography from level land to steep inclinations while performing useful work without breaking the belts, losing drive capability between engaged wheels and belts, or disengaging the belts from the wheels.

SUMMARY OF THE INVENTION

The present invention generally includes a chassis, a pair of longitudinally spaced wheels arranged on each lateral side of the chassis in supporting relation thereto, an endless belt having an elastomeric exterior surface and being highly tensioned to provide frictional coupling between an interior surface thereof and the outer periphery of at least one wheel of each pair, and guide apparatus for maintaining lateral registry between each belt and the associated wheels. The belt tension is regulated by a tensioning apparatus which maintains the frictional coupling, accommodates debris ingestion between the belt and wheels without damaging either, and augments the guide apparatus in maintaining lateral belt to wheel registry. The belts are longitudinally reinforced to permit their high degree of tensioning and are laterally and transversely reinforced to resist movement in those directions and further augment the guide apparatus in retaining lateral registration.

BRIEF DESCRIPTION OF THE DRAWINGS

The advantages of the present invention will become apparent from the following description when read in conjunction with the accompanying drawings in which:

FIG. 3 is a plan view taken along line III—III of FIG. 1;

FIGS. 4 and 5 are respective sectional views of a preferred and an alternate belt construction;

FIGS. 6, 7, and 8 are respective partial sectional views of a preferred, first alternate, and second alternate drive wheel structure;

FIG. 9 is a partial sectional view of a preferred idler wheel structure;

FIGS. 11A and 11B are diagrammatic views of belt portions respectively defining "lateral" and "transverse" flexibility;

FIGS. 12A, 12B, and 12C are diagrammatic, partial sectional views of an engaged driver wheel-belt structure subjected to varying lateral loads;

FIG. 13 is a graphical representation of belt/wheel structure lateral load carrying as a function of deformation thereof;

FIG. 15 is a graphical representation contrasting the present invention's mean power efficiencies with 4-wheel drive vehicle's mean power efficiencies for different soil/soil conditions.

DESCRIPTION OF THE PREFERRED EMBODIMENT

In general, the greatest problems encountered in providing a belt-over-wheel propulsion system for heavy-duty application are:

(1) Maintaining lateral registry between each belt and its entrained wheels when the utilizing vehicle is subjected to high lateral loads;

(2) Maintaining a driving relationship between the driver wheel(s) and the entraining belt; and (3) Accommodating debris intrusion between each belt and its entrained wheels without damaging either.

Solutions to the aforementioned problems will be discussed in conjunction with the structure providing such solutions.

Figure 1:
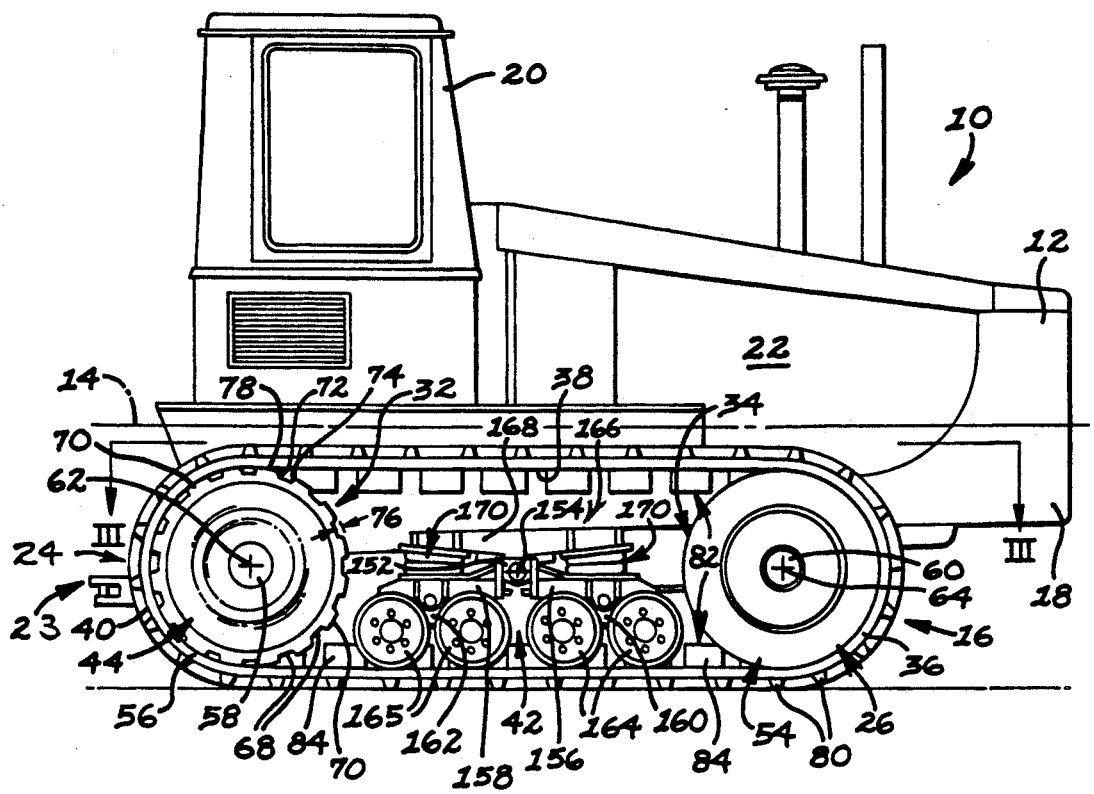
FIG. 1 is a side elevation view of the work vehicle.

Referring now to the drawings in detail, FIG. 1 illustrates an exemplary belt laying work vehicle 10 having a chassis 12 with a longitudinal axis 14 and a propulsion system 16 which resides generally beneath and in supporting relation to a frame 18 which, together with an operator's station 20 and an engine 22, constitutes the chassis 12. A rearwardly protruding drawbar 23 is joined to the frame 18 and constitutes an attachment structure to which draft loads may be connected. Although the exemplary work vehicle 10 constitutes a heavy-duty draft vehicle, the principles inherent in such exemplary structure are applicable to heavy-duty propulsion systems for other vehicles whether such vehicles are used for hauling, pushing, or pulling large loads. The illustrated draft work vehicle 10 was chosen as the exemplary apparatus since it has been actually reduced to practice and tested in a wide range of soil conditions, topographies, and loading characteristics.

The propulsion system 16 includes two pairs of longitudinally spaced apart wheel structures 24,26 which are arranged on opposite lateral sides 28,30 of the vehicle chassis 12 and which have respective radially outwardly facing peripheral surfaces 32,34, a pair of endless, substantially inextensible belts 36 each having an interior 38 and an exterior 40 surface which are respectively engaged with the wheel's outer peripheral surfaces 32,34 and the underlying terrain, and a roller support system 42 which is joined to the frame 18 on each lateral side of the chassis 12 and which is engageable with each belt's interior surface 38 longitudinally between the separated wheel structures 24,26 of each pair. The endless characteristic of the belt 36 means that the belt is continuous and has no connection joint(s).

Inasmuch as the propulsion system 16 has substantially identical components on each lateral side 28,30 of the chassis 12, further reference will only be made to the set of components on the side 28. At least one of the wheel structures on each lateral side of the chassis 12 constitutes a driver wheel structure 44 which frictionally transmits power to the belt 36 from the chassis-mounted engine 22. The wheel structures 24,26 on each side are laterally aligned and have respective circumferential guide channels 46,48 which are each laterally bounded by positioning surfaces 50,52 and are adapted for receiving belt-resident guide structures. In the illustrated embodiment, the other wheel structure on each side constitutes an idler wheel structure 54 which helps to support the vehicle chassis 12, cooperates with the driver 44 to provide a path 56 along which the belt 36 can be driven, and, in the illustrated case, provides a measure of recoil capability. For purposes of the present invention, however, the front wheel structure 26 could also constitute a driver. The rear wheel structure 24 of the illustrated draft vehicle constitutes the driver wheel structure 44 and the front wheel structure 26 constitutes the idler wheel structure 54. The rear 24 and front 26 wheel structures are respectively mounted on laterally protruding axles 58,60 so as to rotate about respective axes 62,64 during vehicle movement.

The driver wheel structure 44 has arcuately spaced, laterally extending grooves 68 distributed in its outer peripheral surface 32. Each pair of adjacent grooves 68 defines an intermediate protuberance 70 having arcuately bounding walls or edges 72,74 of desired radial height 76 and an outwardly facing drive portion 77 of predetermined arcuate length 78 which constitutes the outer peripheral surface 32. "Leading" and "trailing" as used herein refers to the relative positioning of like elements during movement thereof. If the frictional couple between either drive wheel 44 and its associated belt 36 is lost as a result of mud or other friction reducing material intruding therebetween, that driver wheel 44 will rotate relative to the interior surface 38 of the belt 36 so as to cause the leading bounding wall, 72 or 74 depending on direction, of each engaged protuberance 70 to wipe that material from the belt's interior surface 38 into the groove 68 leading each protuberance 70. Such relative rotation continues for short duration, typically less than 90°, until a sufficient part of the belt's interior surface 38 has been cleaned to re-establish the driving frictional couple. Such friction reducing material, subsequent to its deposition into the grooves 68, is transmitted by those grooves 68 generally laterally and returned to the environment.

For frictionally coupling the driver wheel 44 with the belt 36, the maximum surface area for torque transmission therebetween is desired and thus the surface area corresponding to grooves 68 in the driver 44 should be minimized. Use of a single groove 68 requires the driver wheel 44 to rotate nearly one revolution relative to the belt 36 to wipe the torque transmitting area of the belt 36 and thus reestablish the frictional coupling between the belt 36 and driver 44. Such extreme amounts of relative motion results in reduced vehicle productivity, intermittent vehicular movement, and operator discomfort. Moreover, the resultant single groove would have to be very large to effectively conduct the debris wiped from the remainder of the wheel-belt interface. On the other hand, a large number of small grooves 68 would maintain the maximum surface area of frictional torque transmission and avoid the aforementioned disadvantages. However, a minimum cross-sectional area of each groove is necessary to effectively transversely conduct the wiped debris. It has been found that such minimum cross-sectional area has a minimum radial height 76 of about ½ inch. Operational experience indicates that for effective debris conduction, the arcuate length of the grooves 68 need not be greater than the protuberances' arcuate length and should be the minimum consistent with effective conduction of wiped debris. The protuberances 70 will not, for known compounds of rubber and for the tensions required to frictionally couple the belt and drive wheels, effectively transmit torque if their aspect ratio of arcuate length 78 to radial height 76 is less than about 1:1. For practical sized wheels, however, such aspect ratio is preferably not less than about 3:1.

While the illustrated grooves 68 are arranged in the driver 44 at substantially 90° to the chassis' longitudinal axis and have radially oriented bounding walls 72,74, it is to be understood that the grooves 68 could be formed in the belt's interior surface 38 and that other angular arrangements of the grooves 68 and other wall orientations are operationally acceptable for purposes of the present invention. The "grooved" configuration thus provides a substantial contribution in maintaining the driving relationship regardless of the environment.

Figure 2:
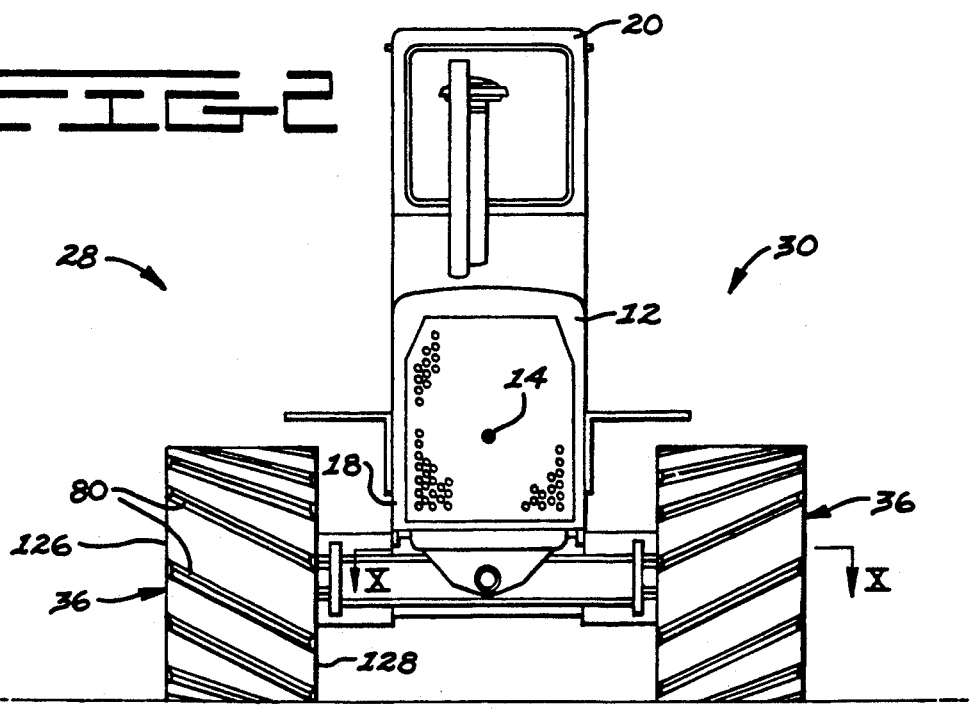
FIG. 2 is a front elevation view of the work vehicle illustrated in FIG. 1.

As illustrated in FIGS. 1, 2, and 3, the front wheel structure 26 has a smooth outer peripheral surface 34 about which the belt 36 is entrained and engaged. Inasmuch as the front wheel structure 26 in the illustrated embodiment constitutes an idler 54, maintaining a friction couple between it and the entraining belt's interior surface 38 is unnecessary.

The interior surfaces 38 of the endless, inextensible belts 36 illustrated in FIGS. 1, 2, and 3 constitute elastomer and are smooth to facilitate frictional engagement thereof with the associated driver 44 while the exterior surfaces 40 have elastomeric cleats 80 protruding therefrom for penetrating the underlying ground and enhancing the belt's tractive capability. The elastomeric character of the cleats 80 permits the illustrated vehicle 10 to travel on improved road surfaces without damaging same. The belts 36 preferably have an ultimate elongation of less than 5% to permit tensioning thereof with reasonable movements of tensioning apparatus and must be capable of sustaining tension loads of approximately 17,000 Newtons per lateral centimeter of belt width to provide the driving friction force typically transmitted by heavy-duty vehicles weighing in excess of about 4,500 Kilograms. As illustrated in FIGS. 1 and 3, each belt 36 has a guide structure 82 which is receivable in the wheels' guide channels 46,48 for maintaining lateral registry between each belt 36 and its entrained wheel structures 24,26. Each guide structure 82 includes alignment members 84 which are longitudinally separated, by way of example, by about 5.5 centimeters, preferably extend inwardly from the lateral center of the associated belt's interior surface 38, and have a high modulus of elasticity.

The rear 24 and front 26 wheel structures are relatively rigid in the lateral direction as compared to radial tires so as to promote belt guiding thereon for heavy-duty vehicle operation on side slopes or in other circumstances where the vehicle is subjected to high lateral loading Due to the character of the exemplary draft vehicle 10 and for reasons to be discussed later relating to wear, greater lateral rigidity of the driver wheel structure 44 is required than of the idler wheel structure 54. The preferred driver wheel structure 44 constitutes a cushioned wheel structure 85 which is illustrated in FIG. 6, and includes a circular rigid metal drum 86 having a solid layer 90 of elastomer which is radially thin relative to the drum's diameter and which is bonded to the drum's outer periphery 92. By way of example the elastomer layer's radial thickness is about 5 centimeters and the drum's radius is about 51 centimeters. The material removing, friction enhancing grooves 68 previously described are resident in the elastomer layer 90. The circumferential guiding channel 46 is arranged about the cushioned wheel structure 85 generally along its mid-circumferential plane 93 to expose opposed inner edges 94 of the elastomeric layer 90 and opposed inner margins 95 of the drum 86. The guiding channel 46 is defined by the laterally opposed positioning surfaces 50,52, each of which includes a base portion 96 and an inner portion 98 which, by way of example, have respective angles of inclination 97 of approximately 90° and 106°. The base portions 96 constitute the inner edges 94 of the elastomeric layer 90 and the inner portions 98 constitute the inner margins 95 of the drums 86. Such inner portions 98 preferably converge in a radially inward direction.

An alternative to such cushioned driver wheel structure 85 is a rigid wheel structure 100 which includes a completely rigid circular drum 86 as illustrated in FIG. 7. Friction enhancing grooves 68 in the rigid wheel structure's outer periphery provide the same material expulsion capability as do the grooves 68 in the elastomeric layer 90. The cushioned driver wheel structure's elastomeric layer 90 cooperates with the belt's interior elastomeric surface 38 to envelop in a non-penetration mode any hard, non-flowable elements such as stones which become sandwiched between the wheel structures 24,26 and entrained belt 36. The rigid driver wheel structure 100 also includes a circumferential guiding channel 46 laterally defined by positioning surfaces 50,52. The completely rigid wheel structure 100 requires additional elastomeric material on the interior of a mating belt structure 36 which is suitable for use with the cushioned wheel structure 85 so as to provide the same propulsion system capacity to envelop and absorb non-flowable debris without sustaining belt penetration. The embodiment of FIG. 6 wherein the cushioning elastomeric layer 90 is arranged on the outer periphery of the drum 86 and on the interior surface of the belt 36 is less costly, requires less total elastomeric substance, and maintains greater longitudinal flexibility for the belt 36 than utilizing, in combination, a rigid driver wheel 100 and thicker, debris enveloping belt.

FIG. 8 illustrates another alternative driver wheel structure 44 which constitutes a pneumatic wheel structure 102 having a pair of laterally separated pneumatic wheels 104,106 which respectively include rigid rims 108,110 and inflatable, bias belted carcasses 112,114 mounted thereon. The bias belted carcasses 112,114 have laterally facing adjacent sidewalls 116,118 which are substantially parallel and preferably each have an angle of inclination 97 of 90° relative to the outer peripheral surface 32 thereof. The sidewalls 116,118 respectively include positioning surfaces 50,52 which define the circumferential guide channel 46. Unlike conventional carcasses, the sidewalls 116,118 of the carcasses 112,114 are thicker and more planar to respectively provide greater lateral rigidity and better positioning surfaces 50,52 for engagement with the guide structure 82 with minimum surface area. Radial tire carcasses have insufficient rigidity in the lateral direction to provide the guiding required in all heavy-duty applications but the bias carcasses 112,114 will, in certain heavy-duty applications, such as motor grader vehicles, provide the requisite lateral stiffness. The lateral stiffness of the driver wheels 44 is an important factor in maintaining lateral registry of the belt 36 and wheels 24,26.

Figure 14A:
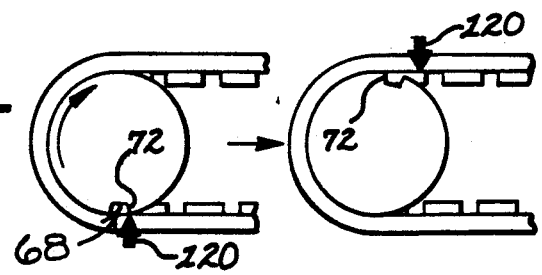
FIGS. 14A, 14B, 14C, 14D, 14E, and 14F are diagrammatic representations of the relative operational configurations of a bias tire/belt and a rigid or cushioned wheel/belt and wear characteristics exhibited thereby.
Figure 14B:
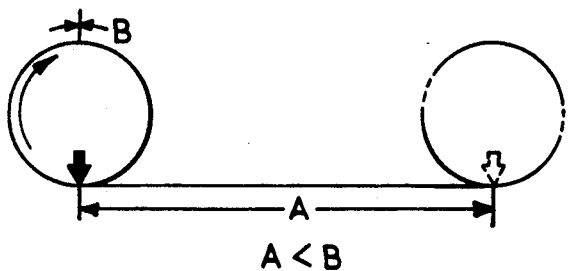
Figure 14C:
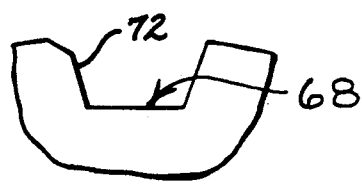

The outer periphery 32 of the alternate pneumatic driver wheel structure 102 constitutes circumferentially alternating friction enhancing grooves 68 and protuberances 70 whose structure is the same as that shown for the driver wheel structures 44 illustrated in FIGS. 6 and 7. Both the cushioned 85 and rigid 100 driver wheel structures are preferred over the pneumatic carcass driver wheel structure 102 for applications in which pantagraphing and/or relative motion between the wheel driver structure 44 and belt 36 cannot be tolerated and still provide reasonable wear. Other than the well-known pantagraphing which all bias tires experience, bias tires, when under load, also exhibit a phenomenon of tracing out a footprint for one revolution thereof which is shorter by approximately 2%–3% than is the circumference around such tire's outer periphery when unloaded. Such circumferential changing phenomenon causes relative motion between each belt's interior surface 38 and the protuberance's drive portions 77. Such motion results in wear of the leading edge 72 (for forward vehicle motion) of the protuberances 70 and thus reduces the arcuate length 78 of their drive portions 77. The practical effect of such wearing substantially reduces the wiping action of the protuberances 70 on the interior surface 38 of the belt 36 which, in turn, reduces the friction coupling between the drive wheel structure 44 and the belt 36 when they are operated in mud or other adverse, friction coefficient reducing environments. Such relative bias wheel-to-belt motion during frictional engagement is illustrated in FIG. 14A where, for purposes of illustration, only one lateral groove 68 and associated protuberance's leading edge 72 are illustrated at the left side of FIG. 14A with the leading edge 72 being in circumferential alignment with a belt mark arrow 120 which marks the matching position of the belt 36. The right side of FIG. 14A illustrates the relative positioning of the belt mark 120 and the protuberances' leading edge 72 after rotation of the bias wheel in the indicated direction. The belt marker 120 moves a further linear distance than did the protuberances' leading edge 72 so as to demonstrate the relative movement therebetween. FIG. 14B illustrates the principle that when such bias wheel is rotated under load for one revolution, it moves a linear distance A which is less than the bias wheel's circumference B when unloaded. The resulting wear of the protuberance's leading edge 72 is respectively shown in FIG. 14C.

Figure 14D:
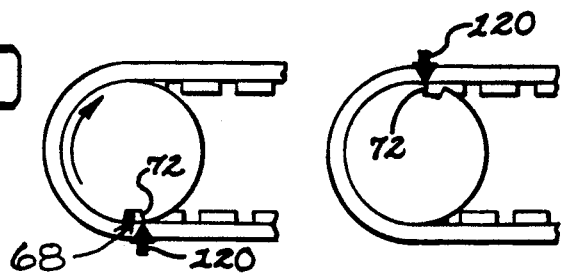
Figure 14E:
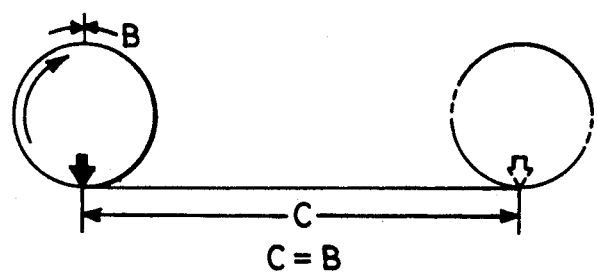
Figure 14F:
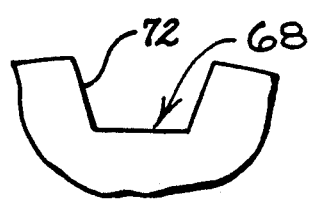

FIGS. 14D and 14E illustrate the lack of relative movement between an entraining belt 36 and a cushioned 85 or rigid 100 wheel structure as respectively shown in FIGS. 6 and 7. The rigid 100 or cushioned wheel 85, when rotated one revolution under load, traverses a linear distance C, as diagrammatically illustrated in FIG. 14E, which is substantially equal to its unloaded circumference B. No relative movement between the driver's outer periphery 32 and the entraining belt 36 occurs during driver rotation as is sequentially illustrated in FIG. 14D. Accordingly, the leading edge 72 of the single illustrated protuberance 70 exhibits little wear, retains the shape illustrated in FIG. 14F, and maintains its belt wiping capability.

FIG. 9 illustrates the preferred embodiment of the idler wheel structure 54 and constitutes a pair of inflatable pneumatic wheels 104,106 which are similar to those shown in FIG. 8, but lack the lateral, friction enhancing grooves. The lateral separation space or circumferential guiding channel 48 between the wheels 104,106 is arranged along the wheel structure's mid circumferential plane 107 and is bounded and defined by the adjacent, laterally facing positioning surfaces 50,52 which cooperate to provide belt-to-wheel guiding. The work vehicle 10 illustrated in FIG. 1 is primarily intended for agricultural use and thus requires a limited but finite recoil capacity for cases where debris of a specified size may intrude between either of the wheel structures 24,26 and the belt 36. The pneumatic idler wheel structure 54, due to its ability to elastically deform, inherently provides the degree of recoil necessary to accommodate debris normally encountered in most agricultural applications while continuing to function and without overstressing the belt, wheels, or support structure for the wheels. Such recoil capability is a contributing factor in non-destructably accommodating debris intrusion.

FIGS. 4 and 5 respectively illustrate the presently preferred belt structure 122 and an alternative belt structure 124. The preferred belt structure 122 includes an elastomeric interior surface 38, an elastomeric exterior surface 40, and a pair of lateral sides 126,128 which respectively engage the wheel structures' outer peripheries 32,34, the underlying terrain, and bound the interior 38 and exterior 40 surfaces. The preferred belt 122 has a body portion 130 which is defined by the interior 38 and exterior 40 surfaces and by the lateral edges 126,128 and has a central plane 132. The guide structure 82 joined to and protruding interiorly from the belt's interior surface 38 constitutes elastomeric material and is receivable in the wheels' guiding channels 46,48 to maintain lateral registry therewith. The longitudinally separated alignment members 84, better illustrated in FIG. 1, each have a pair of opposed, generally laterally facing locating surfaces 134 and a tip surface 136. Each locating surface 134 has a base portion 138 and an inner portion 140 which have respective exemplary angles of inclination 97 of approximately 94° and 110° relative to the laterally adjacent portion of the interior surface 38. The locating surfaces' base portions 138 are radially co-extensive with the guide channel's base portions 96. By way of example, the height of the base 138 and inner 140 portions perpendicular to the interior surface 38 are about 5 and 10.2 centimeters, respectively. Each alignment member 84 has, by way of example, a lateral width 141 of about 11.2 centimeters and a longitudinal length of about 15.2 centimeters. The cleats 80 are attached to the exterior surface 40 of the belt body portion 130 and extend exteriorly therefrom.

A belt reinforcing structure includes at least one inextensible reinforcing filament 142 which is wrapped longitudinally in the body portion 130 from one lateral side 126 thereof to the other lateral side 128 such that when the belt 122 is installed on the wheel structures 24,26, each circumferential wrap or turn 143 of the filament 142 is substantially parallel to the chassis' longitudinal axis 14. The reinforcing filament is interiorly disposed within the body portion 130 and a pair of breaker plies 144,146, well-known in the art and constituting part of the reinforcing structure, are arranged in the body portion between the central plane 132 and the reinforcing filament 142. The breaker ply 144 adjacent the reinforcing filament is laterally more narrow than is the lateral extent of the filament wraps 143. The breaker ply 146 disposed adjacent the central plane 132 is, in turn, laterally more narrow than the other breaker ply 144. Each breaker ply 144,146 has stiffening fibers therein which are preferably arranged at 90° to the stiffening fibers in the adjacent breaker ply 144,146 and, in the installed position of the belt on the vehicle, are preferably oriented at 45° relative to the chassis' longitudinal axis 14. The reinforcing structure includes a plurality of longitudinally separated, laterally extending reinforcing elements 148 which are arranged in the body portion 130 on the opposite side of the central plane 132 from the reinforcing filament 142 and breaker plies 144,146.

The reinforcing filament 142 provides the belt 36 with its longitudinally inextensible yet flexible character which is necessary to resist undesired stretching of the belt 36 when it is subjected to the tension force necessary to frictionally couple it to the entrained driver wheel structure 44. Such longitudinal reinforcement allows, however, sufficient belt flexibility to readily conform to the outer peripheries 32,34 of the wheel structures 24,26 without diverting undue amounts of power from the vehicle's engine 22 for longitudinally conforming the belt to the wheel structure's outer peripheries. The bias plies 144,146 provide lateral stiffness to the belt 122 while the lateral reinforcing elements 148 provide transverse stiffness to the belt 122 which are respectively necessary to resist the exemplary deformations depicted in FIGS. 11A and 11B of a schematically illustrated belt. The lateral belt stiffness resists "snaking" as illustrated in FIG. 11A and cooperates with the wheel structures 24,26 in maintaining lateral registry therewith by resisting side loads imposed by the vehicle's chassis. The transverse stiffness provided by the reinforcing structure's lateral reinforcing elements 148 resists transversely imposed forces as illustrated in FIG. 11B, tends to promote the correct orientation of the belts' guide structure 82 for suitable reception in the guide channels 46,48, and contributes to maintaining the lateral registry between the belt 122 and wheel structures 24,26. Without such transverse stiffness, the belts 36 could assume the configuration illustrated in 11B causing the alignment members 84 to cock as shown and thus promote disengagement of the guide structure 82 from its guide channels 46,48 and, thus, disengagement of the belt 36 from the associated wheel structures.

An alternate belt structure 124, illustrated in FIG. 5, has an interior surface 38, an exterior surface 40, and opposed lateral edges 126,128 which respectively engage the wheel structures' outer peripheries 32,34, the underlying terrain, and laterally bound the interior 38 and exterior 40 surfaces. The alternate belt structure 124 has a body portion 130 which is defined by the interior 38 and exterior 40 surfaces and the lateral edges 126,128 and has a central plane 132. The alternate belt has a reinforcement structure which includes at least one reinforcing filament 142 similar to that of FIG. 4 which is wrapped in the body portion 130 in a manner and location substantially identical to that of FIG. 4. A pair of breaker plies 144,146, of similar structure and orientation to the breaker plies of FIG. 4, constitute a portion of the reinforcement structure and are arranged between the reinforcing filament 142 and the belts' exterior surface 40 in a similar manner to those of FIG. 4. The reinforcement structure of the alternate belt construction 124 lacks the reinforcing elements 148 of FIG. 4 but, for some applications, provides a satisfactory extent of transverse rigidity. The guide structure 82 of FIG. 5 is identical to that of FIG. 4 and is joined to the alternate belt 124 in a manner and location identical to that of the preferred belt 122. It is to be understood that the longitudinal filament 142 is illustrated by example only and that more filaments could be wrapped in parallel or that multiple filaments could be wrapped in an end-to-end manner rather than each filament 142 being continuous for the entire belt.

FIG. 3 illustrates a partial cutaway view of a portion of the propulsion system 16. The center portion of the top belt run has been removed to expose the cooperative arrangement of the belt 36 and entrained wheel structures 24,26. The front 26 and rear 24 wheel structures have respective mid circumferential planes 107,93 which are preferably aligned along a common longitudinal path 150 which is parallel to the chassis' longitudinal axis 14. The circumferential guiding channels 46,48 on the rear and front wheel structures lie along the path 150 so as to promote entry therein of the belt's guide structure 82.

As best illustrated in FIGS. 1 and 3, the roller support system 42 distributes a portion of the weight and load imposed on the vehicle frame 18 to the belt's interior surface 38 longitudinally between the entrained wheel structures 24,26. The roller support system 42 includes a mounting structure 152 which is pivotally connected to the frame 18 about a mounting axis 154, a leading 156 and a trailing 158 support arm connected to the mounting structure 152 and adapted to rotate about the mounting axis 154, a leading 160 and a trailing 162 connection structure which are respectively pivotally mounted on the leading 156 and trailing 158 support arms, two pair of roller structures 164,165 which are rigid in all directions and which are respectively rotatably mounted on the connection structures 160,162, and a force reaction structure 166 for biasing either support arm 156,158 increasingly toward the belt's interior surface 38 in response to the belt's interior surface 38 being increasingly biased toward the other support arm 156,158. The biasing structure 166 includes a force transfer member 168 which is preferably pivotally connected to the mounting structure 152 about the mounting axis 154 and a resilient structure 170 such as rubber springs or inflatable air bags arranged between the force transfer member 168 and each support arm 156,158 for biasingly transmitting forces exerted on the force transfer member 168 by one support arm to the other support arm. Each roller structure 164 constitutes a pair of laterally separated roller elements 172 which are rollingly engaged with the belt's interior surface 38 on the lower belt run. The separation distance between laterally adjacent roller elements 172 constitutes a guide slot 174 which is laterally aligned with the associated circumferential guide channels 46,48. The belts' guide structures 82 longitudinally traverse the guide path formed by the wheel structures' circumferential guide channels 46,48 and the roller structures' guide slots 174. By virtue of the guide structures' residence in the guide slots and channels, lateral registry of the belt 36 with the associated wheel structures 24,26 and roller structures 164,165 is assured.

Frictional coupling of the drive wheel 44 structure and entraining belt 36 requires biasing the belt into engagement with the driver wheel structure 44 with a normal force which, when multiplied by the coefficient of friction therebetween, is at least as great as the force which the engine 22 can exert on the ground through the belt 36 if a positive drive system was provided. Each belt 36 is tensioned by separating the longitudinally distal portions of the cooperating front 24 and rear 26 wheel structures. Common means for separating such longitudinally distal wheel structure portions include inflating the pneumatic carcasses 112,114 of the entrained wheel structures 24,26 and biasing the cooperating wheel structures 24,26 longitudinally apart either through wheel movement on their mounting axles or longitudinally separating the mounting axles 58,60. If, as previously described, sufficient recoil capability is provided by one pneumatic wheel structure such as 54 in each cooperating pair 24,26, the front wheels' pneumatic carcasses 112,114 can provide such recoil as well as tensioning the belts 36.

Figure 10:
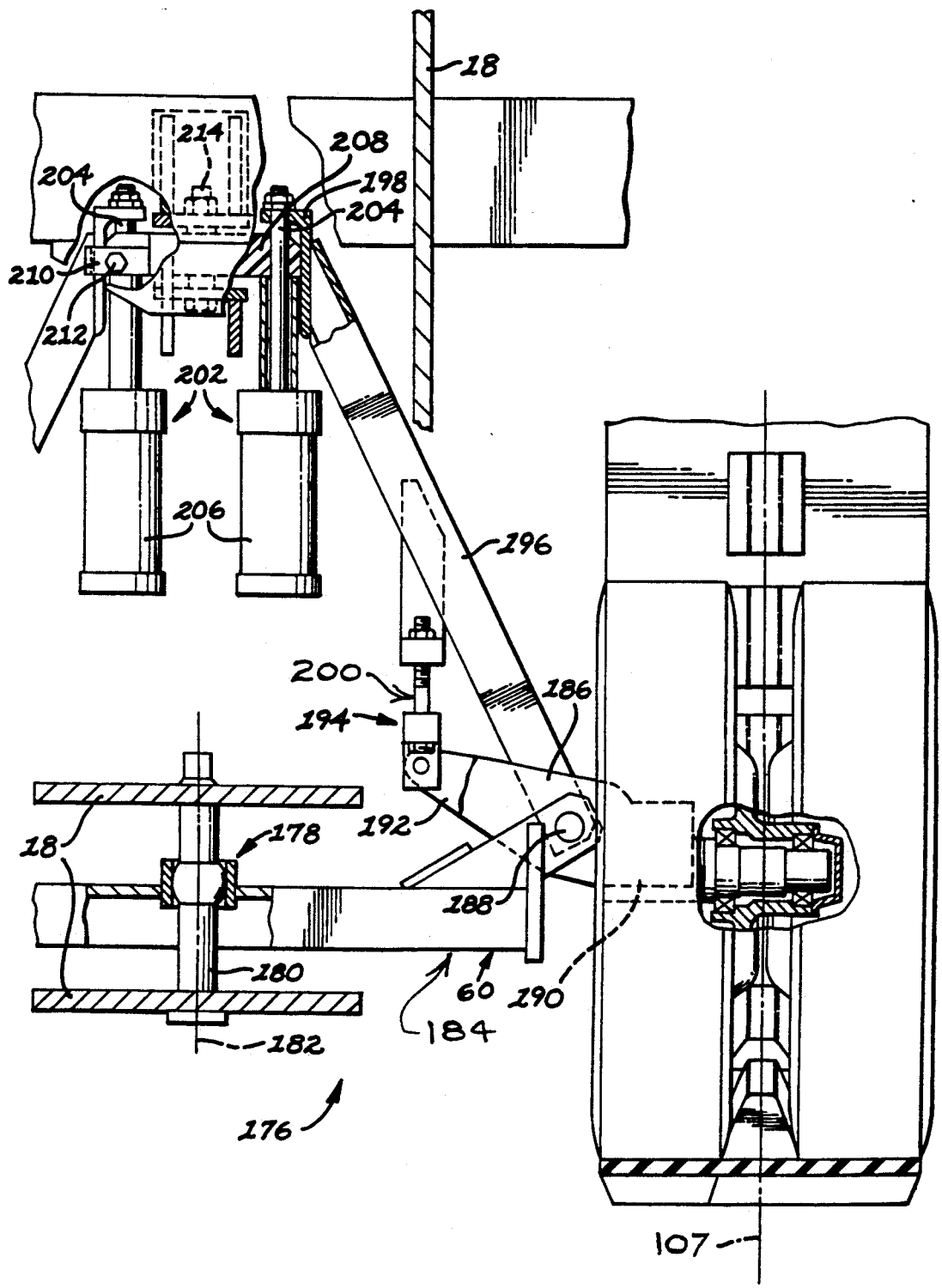
FIG. 10 is a partial sectional view taken along line X—X of FIG. 2.

If, however, pneumatic wheel structures such as 54 provide insufficient recoil capability or both cooperating wheel structures 24,26 need be rigid, additional recoil capability becomes necessary. Accordingly, in addition to the pneumatic front wheel structure 54, a recoil/tensioning apparatus 176 was separately provided and is shown in FIG. 10. The front axle 60 of the exemplary work vehicle 10 is pivotally mounted on the frame 18 through a sliding spherical bearing 178 about a pivot pin 180 which defines a longitudinal pivot axis 182 which is parallel to the chassis' longitudinal axis 14. The front axle 60 includes a frame mounted base portion 184 and two extension portions 186 which are each pivotally mounted at an intermediate region thereof to the base portion 184 about an adjustment pin 188. Only one extension portion 186 is shown since the extension portions are identical and are mounted on opposite lateral ends of the base portion 184. Each axle extension portion 186 has a laterally outwardly protruding wheel mounting region 190 on which a front wheel structure 26 is mounted and an adjustment region 192 which protrudes inwardly and is connected to a "toe in - toe out" apparatus 194 for adjusting the orientation of the front wheel structures' mid circumferential plane 107. A strut 196 for tensioning the belt 36 connects the axle 60 at the adjustment pin 188 to a foundation member 198. The adjusting apparatus 194 includes a screw bolt 200 which threadably joins the axle adjustment region 192 to the strut 196.

A pair of hydraulic cylinders 202 each have a rod end 204 and a head end 206 which are respectively connected to the foundation member 198 and a thrust block 208 which is longitudinally slideable on the foundation member 198. A retainer 210 is positioned vertically adjacent the thrust block 208, extends laterally adjacent the foundation member 198, and is joined to the thrust block 208 by a screw bolt 212. Four retainer/screw bolt combinations 210,212, one above and one below at each lateral end of the thrust block 208, are utilized with the present invention. The thrust block 208 is pivotally mounted on the frame 18 by a swivel pin 214 which is coaxial with the pivot pin axis 182. To accommodate applications where insufficient recoil is provided by one or more pneumatic wheel structures such as 54, where the wheel structures and/or axles cannot be accurately located or precisely oriented to ensure accurate correlation between inflation pressure and the desired engagement pressure, or where the inextensible belt 36 cannot be installed or removed from the entrained wheel structures 24,26 simply by deflating the pneumatic wheels due to interference of the guide structure 82 with such deflated pneumatic wheels, it is believed to be more effective, less costly, and operationally of greater practicality to provide a separate mechanism such as the present invention's axle movement/belt tensioning system 176. Such tensioning system provides a substantial contribution to enabling debris ingestion without damaging vehicle components.

The alignment members 84 sequentially pass through an alignment phase and a load carrying phase during their residence or partial residence in the wheel structures' guide channels 46,48 and the roller structures' guide slot 174. The alignment phase begins when the inner locating surface portions 140 of the alignment members and the base positioning surface portions 50,52 move into lateral adjacent relationship. Lateral alignment of the wheel or roller structures and the alignment members 84 is provided by the progressive entry of the alignment members 84 into the guide channels 46,48 and guide slot 174. If misaligned, the appropriate base positioning surface portion 50,52 serially engages the adjacent inner 140 and base 138 positioning surface portions to initially induce lateral deformation of the alignment members 84 which deformation decreases with increasing entry to cause relative lateral displacement of the alignment members 84 and the wheel or roller structures. The load carrying phase begins upon complete entry of the alignment members 84 in the guide channels 46,48 and slot 174 and continues until alignment members 84 exit therefrom. Discussion herein of the guide structure 82's interaction with the wheel and roller structures is limited to the load carrying phase of engagement therebetween.

FIGS. 12A, 12B, and 12C illustrate cross-sectional views of the relative configuration of the preferred driver wheel structure 85 and the entraining belt 36 for increasing degrees of side force exerted by the wheel structure 85 on the belt 36. FIG. 12A illustrates the engaged wheel structure and entraining belt for linear movement of the vehicle 10 on terrain having no side slope. There is a running clearance at the outer periphery 32 of the wheel structure 85 between laterally adjacent locating 134 and positioning 50,52 surfaces of approximately 0.3 centimeters. FIG. 12B illustrates the belt/entrained drive wheel structure 85 when the vehicle 10 is operated on a side slope or is making a turn. The respective base portions 138 and 96 of the guide structure's left locating surface and the wheel structure's right positioning surface 50 deform to provide surface engagement therebetween. The deformation illustrated in FIG. 12B is characteristic for most side hill conditions or vehicle turns and constitutes a radial distance of engagement therebetween of approximately 2½% of the wheel's diameter. FIG. 12C illustrates the belt/entrained driver wheel structure 85 when the utilizing vehicle 10 is making a turn on a steep side slope. The base portions 138,96 of adjacent left locating and right positioning surfaces have fully engaged but such surface engagement remains near the wheel structures' outer periphery since the lateral engagement area therebetween is within 5% of the wheel structures' outer periphery.

FIG. 13 is a graphical representation of the lateral loads which are supported by the guide structure 82 as a function of the guide structure's deformation. Numbers have not been placed on FIG. 13 because the load and deformation magnitudes are a function of the vehicle weight, the material characteristics of the drive wheel and entraining belt, and the relative size of the engageable positioning and locating surfaces. FIG. 13 is instructive, however, for purposes of noting the trend in guide structure/driver wheel deformation for increasing load. The configuration of FIG. 12A operates in the region designated 12A on FIG. 13 where there is no load and no deformation. The configuration illustrated in FIG. 12B operates at the point designated 12B on FIG. 13 where some limited locating surface/positioning surface deformation has been sustained in resisting the side load. The belt/driver wheel configuration illustrated in FIG. 12C occurs for the deflection and load indicated on FIG. 13 by the reference numeral 12C. For the configuration of FIG. 12C, the base portions of the elastomeric locating 134 and positioning 50 surfaces have become completely engaged and any more load exerted thereon will be resisted at a higher rate and lower deformation since the location surface's inner portion 140 will thereafter increasingly engage the inner portion 98 of the rigid drum's positioning surface 50. Such increased load acceptance for a given deformation is graphically represented by the relatively steeper slope on the load/deformation curve of FIG. 13 for loads and deformations greater than those corresponding to the point marked 12C.

Maintaining the friction couple between the driver wheel structures and associated belts minimizes the relative motion and reduces wear thereof. Insofar as engagement therebetween is limited to the radially facing driver wheel and belt surfaces, the wear problem does not exist. Maintaining lateral registry of the driver wheel 44 and belt 36 when lateral loads are exerted on either necessitates engagement between lateral surfaces of both. Such lateral surface engagement results in relative motion between the wheel and belt at the points on the wheel where the belt initially engages and disengages therewith. Between such points the lateral engaging surfaces either have no relative motion or are not engaged. At such points, however, the belt is moving in a linear mode while the mating wheel is rotating and relative motion between the laterally engaging surfaces is unavoidable. Increasing relative motion results at increasing radial distances from the wheel's outer peripheral surface 32. It is, accordingly, necessary to minimize the radial extent of lateral surface engagement and still provide lateral guiding therebetween. The belt's alignment members 84 are laterally tapered in a convergent manner such that their locating surfaces 134 diverge from the adjacent positioning surfaces 50,52 to minimize the lateral surface contact therebetween but are not tapered to such an extent that the driver wheel 44 can easily "walk up" the side thereof and unbelt itself. Multiple alignment members 84 are used rather than a continuous member to avoid the elevated levels of compression on the innermost fibers thereof during belt conformance around the entrained wheel structures.

The bond between the elastomeric alignment members 84 and each interior surface 38 has been found to be more durable in operation than the bond formed between elastomeric belt bodies and metal guides partially encased therein and partially protruding therefrom. Inasmuch as vehicle mobility and maneuverability is directly affected by the guiding interaction between the alignment members 84 and the wheel structures, the reliability of the alignment member-belt bond is of critical importance to the operation of the present invention.

The lateral most passes of the belt's longitudinal filament(s) 142 are arranged laterally beyond the driver wheel's outer peripheral surface 32 with which the belt is engaged as illustrated in Figs. 12A, 12B, and 12C. The purpose of such disposition is to lower the stresses imposed on those laterally outermost filaments when extreme amounts of debris are ingested between the belt 36 and wheels 24,26. Such outer filaments experience the highest stress levels because ingested debris typically has a wedge shaped cross section with the greatest thickness being at the lateral extremes of the belt 36. In the illustrated embodiment the driver wheel 44 is laterally tapered at its outer periphery 32, but an equally effective solution to such problem is to laterally extend the belt and longitudinal filaments beyond the lateral edges of untapered driver wheel structures. Both such arrangements contribute toward the goal of accommodating debris ingestion without damaging propulsion system components.

The data presented in FIG. 15 illustrates the projected relative mean efficiencies of 4-wheel drive agricultural tractors and the present invention belted vehicle 10 in four different soils/soil conditions. Efficiency is defined as the ratio (expressed as a percentage) of the vehicle's drawbar horsepower divided by engine horsepower. Mean efficiency is the average of the vehicle's peak efficiency and the efficiency corresponding to a pulling force 10% less than that exerted at the peak efficiency. Such mean efficiency is considered representative of the actual way an agricultural tractor is used. While it is to be understood that soils and their conditions constitute a continuum based on many factors such as moisture, ground compaction, etc. rather than the discrete classifications shown, such classifications are useful for illustrating the relative vehicular performance for the acreage segments in the United States now tilled with 4-wheel drive vehicles. Soils in other parts of the world exhibit similar characteristics and can be generally categorized into the illustrated classifications, but the existing percentage of each soil/soil condition classification, worldwide, is unknown. The belted vehicle's advantage, however, for the illustrated soil/soil condition classifications remain 8.0%, 11.0%, 27.0%, and 56.0%.

The firm, strong classification is generally represented by Midwest soil, refers to the soil's high resistance to vehicular sinking and high shear strength, and constitutes about 35% of the U.S. acres presently tilled by 4-wheel drive vehicles. The firm, weak classification generally represents Southwest soil, refers to the soil's high resistance to vehicular sinking and low shear strength and constitutes about 30% of the U.S. acres now tilled with 4-wheel drive vehicles. The tilled classification is generally representative of any farmed soil which has already been plowed or otherwise tilled and constitutes about 25% of the 4-wheel drive-tilled acres in the U.S. The soft, weak classification is generally represented by any soil which is wet and loose, refers to the soil's low resistance to vehicular sinking and low shear strength, and makes up about 10% of the acres presently tilled in the U.S. by 4-wheel drive vehicles. The belted vehicle's advantage varies from 8.0% in firm, strong soil to 56% in soft, weak soil. In general, the softer and looser the soil, the greater will be the belted vehicle's advantage.

These projections are based on data gathered during experimental, side-by-side testing in a variety of soils and soil conditions of a 4-wheel drive agricultural tractor weighing about 14,900 Kg and having a nominal engine rating of 260 Kw and the belted vehicle weighing about 10,900 Kg and having a nominal engine rating of 180 Kw. The final results of one series of tests showed the belted vehicle to have tilled only 4% less ground in the same time period while consuming 26% less fuel than the 4-wheel drive tractor. Insofar as the subject belted vehicle engaged in the testing was an experimental prototype, the results, while dramatic, can be further improved.

Figure 16:
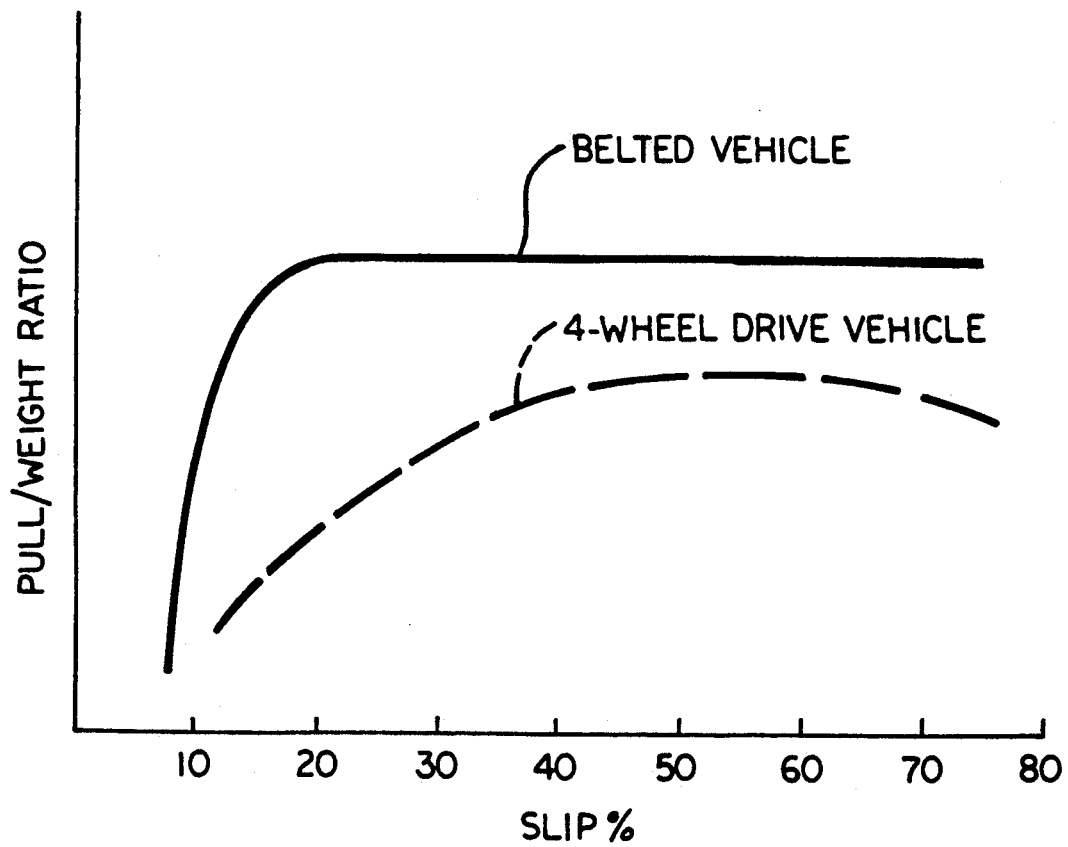
FIG. 16 is a graphical representation of the pull/weight ratio as a function of the propulsion system's slip percentage for the present invention and a 4-wheel drive vehicle.

Propulsion system "slip percentage" is defined as the following ratio expressed as a percentage 100−[(velocity of the vehicle)/(velocity of the propulsion system's ground engaging portion)]. The maximum pull/weight ratio of 4-wheel drive vehicles varies with soil conditions, vehicle balance, load characteristic, etc., but generally corresponds to a slip percentage averaging about 20–40%, as compared to the belted vehicle, whose maximum pull/weight ratio generally corresponds to a slip percentage of about 8-15%. FIG. 16 diagrammatically illustrates a representative set of curves which show the belted vehicle developing its maximum pull/weight ratio at a substantially lower slip percentage than does the 4-wheel drive vehicle Of course, higher rates of slip result in higher wear rates of all drive components, but most especially the ground engaging portions.

The belted and 4-wheel drive tractors exerted approximate respective ground pressures of 3.45 Newtons per square centimeter and 10.3 Newtons per square centimeter. While it is well-known that crops often grow faster in soils having little compaction as compared to soils having greater compaction, one agriculturist actually observed that crops grown in soil tilled by the belted vehicle grew faster than crops grown in soil tilled by the higher powered, heavier 4-wheel drive tractor.

Vehicle operators reported a smoother ride from the belted vehicle 10 as compared to the wheel tractor which improvement manifests itself in comparatively improved operator performance as the time of operation increases. The ride improvement is also indicative of reduced maintenance requirements of chassis mounted components since those components are isolated from impact loads which commonly occur in traversing uneven terrain.

It should now be apparent that an elastomeric belt laying vehicle 10 has been provided which traverses improved road surfaces at high speed without inflicting damage, which has superior tractive effort and low unit ground pressure as compared with comparably powered wheel vehicles, and which provides improved ride characteristics as compared with wheeled vehicles used in comparable conditions.

We claim:

1. A heavy duty belt laying work vehicle comprising:
   a) a frame having opposed lateral sides;
   b) a pair of longitudinally separated wheel structures having radially outwardly facing outer peripheral surfaces and being mounted in supporting relation to said frame on each lateral side thereof and at least one of each pair including a driver;
   c) a pair of endless, inextensible belts each having opposite lateral sides and an interior surface and each being entrained about a respective pair of said wheel structures, a plurality of laterally extending grooves being disposed on one of said interior surface and said outer peripheral surface of each belt and entrained driver, respectively, for removing debris from therebetween;
   d) means for controllably tensioning and urging each belt's interior surface and said outer peripheral surface of the associated driver into frictional driven engagement, said tensioning means including means for longitudinally separatingly biasing the axis of rotation of the wheel structures of each pair;
   e) mean for rotating each of said drivers; and f) guiding means including interengaging portions of said wheel structures and entraining belt for minimizing lateral movement of each belt relative to the respective entrained wheel structures and for radially localizing lateral engagement of each belt and the respective entrained driver to locations substantially adjacent said outer peripheral surface.

2. The belt laying vehicle of claim 1, wherein said drivers are of a rigidity adapted to maintain said drivers against deflection in response to relatively high lateral loads.

3. The belt laying vehicle of claim 2, wherein each of said drivers includes
 a laterally rigid drum; and
 a radially thin layer of elastomer joined to said drum and having an outer face defining the outer peripheral surface.

4. The belt laying vehicle of claim 1, wherein said tensioning means includes:
 a pneumatic wheel structure defining the other wheel structure of each pair and being adapted to increase the respective tension in response to increasing inflation pressure 5. The belt laying vehicle of claim 1 wherein the circumference of each driver wheel structure is maintained substantially constant during rotation, under load.

6. The belt laying vehicle of claim 1 wherein said grooves define and are separated by protuberances, each protuberance having a radially outwardly facing portion of predetermined arcuate length and a pair of arcuately bounding walls of predetermined height less than said predetermined length.

7. The belt laying vehicle of claim 1, wherein said guiding means includes
 a plurality of longitudinally separated alignment members each having a locating surface and being connected to and extending interiorly from a respective belt; and
 a positioning surface connected to each wheel structure and being positioned laterally adjacent said locating surfaces 8. The belt laying vehicle of claim 7, wherein said laterally adjacent surfaces diverge from each belt's interior surface and are adapted to limit guiding contact between the alignment members and the wheel structures to an area adjacent said outer peripheral surfaces.

9. The belt laying vehicle of claim 7, wherein said positioning surfaces each have an angle of inclination relative to said outer peripheral surface of approximately ninety degrees.

10. The belt laying vehicle of claim 7, wherein said adjacent surfaces diverge at an angle less than about twenty degrees.

11. The belt laying vehicle of claim 7 including:
 means for distributing a predetermined fraction of the weight of said frame to the interior surface of each belt longitudinally between said wheel structures of each pair.

12. The belt laying vehicle of claim 11, wherein said weight distribution means includes,
 a) a mounting structure connected to said frame;
 b) a first and a second arm pivotally connected to said mounting structure about a pivot axis;
 c) a first and a second roller structure being respectively rotatably joined to said first and second arms; and
 d) means for biasingly transmitting forces exerted on one of said arms by the roller structure joined thereto to the other roller structure through said other arm.

13. The belt laying vehicle of claim 12, wherein each of said roller structures includes:
 a pair of laterally separated rollers which define a guiding slot adapted for receiving said alignment members.

14. The belt laying vehicle of claim 1, wherein said belt includes:
 a closed loop elastomeric body portion; and
 a flexible, inextensible filament structure longitudinally wound in and bonded to said body portion and defining a plurality of laterally separated wraps, said wraps adjacent opposite lateral sides of each belt being disposed laterally beyond said entire outer peripheral surface of said entrained driver.

15. A heavy duty belt laying work vehicle comprising:
 a) a frame having opposed lateral sides;
 b) a pair of longitudinally separated wheel structures having peripheral surfaces and being disposed on each lateral side of said frame in supporting relationship therewith, at least one wheel structure of each pair being a driver having a substantially constant circumference during rotation under load and having arcuately separated, laterally extending grooves in said peripheral surface;
 c) a pair of endless, inextensible belts each having an interior surface and an elastomeric, ground engaging exterior surface and each being entrained about a respective pair of said wheel structures;
 d) means for controllably biasing each belt's interior surface and associated driver's outer peripheral surface into frictional driving relationship, said biasing means including means for longitudinally separating the wheel structures of each pair;
 e) means for rotating each of said drivers; and
 f) guiding means including cooperating portions of said wheel structures and belts for retaining lateral alignment thereof and for constraining lateral engagement between each belt and the respective entrained driver to a site substantially adjacent said outer peripheral surface.

16. A heavy duty belt laying work vehicle comprising:
 a) a frame having opposed lateral sides;
 b) a pair of longitudinally separated wheel structures being mounted in supporting relation to said frame on each lateral side thereof and at least one of each pair including a driver having a laterally rigid drum and a radially thin layer of elastomer joined directly to said drum, each elastomer layer having a radially outwardly facing outer peripheral surface;
 c) a pair of endless, inextensible belts each having opposite lateral sides and an interior surface and each being entrained about a respective pair of said wheel structures;
 d) means for controllably tensioning and urging each belt's interior surface and said outer peripheral surface of the associated driver into frictional driven engagement, said tensioning means including means for longitudinally separating the wheel structures of each pin;
 e) means for rotating each of said drivers; and f) guiding means including interengaging portions of said wheel structures and entraining belt for minimizing lateral movement of each belt relative to the respective entrained wheel structures and for radially localizing lateral engagement of each belt and the respective entrained driver to locations substantially adjacent said outer peripheral surface.

17. The belt laying vehicle of claim 15, wherein said guiding means includes:

a plurality of longitudinally separated alignment members each extending interiorly from and being joined to each belt, each alignment member having a locating surface; and a positioning surface on each wheel structure being laterally adjacent and engageable with said locating surface.

18. The belt laying vehicle of claim 17, wherein said laterally adjacent surfaces diverge from said outer periphery and said locating surfaces are disposed at an angle of inclination of approximately ninety degrees 19. The belt laying vehicle of claim 15 wherein each of said drivers is laterally rigid.

20. The belt laying vehicle of claim 19, wherein said drivers each include a rigid drum; and a radially thin layer of elastomer joined to said drum and having an outer face defining said outer peripheral surface.

21. The belt laying vehicle of claim 15, wherein said biasing means tensions said belts to at least eight hundred fifty Newtons per lateral centimeter of belt.

22. The belt laying vehicle of claim 15, wherein said biasing means includes:

a pneumatic wheel structure defining the other wheel structure of each pair and having an inflatable carcass whose circumference increases with increasing inflation pressure.

23. The belt laying vehicle of claim 15 including:

means for distributing a predetermined fraction of the weight of said frame to the interior surface of each belt longitudinally between said wheel structures of each pair.

24. The belt laying vehicle of claim 23, wherein said weight distribution means includes a) a mounting structure connected to said b) a first and a second arm pivotally connected to said mounting structure about a pivot axis;

c) a first and a second roller structure being respectively rotatably joined to said first and second arms; and d) means for biasingly transmitting forces exerted on one of said arms by the roller structure joined thereto to the other roller structure through said other arm.

25. The belt laying vehicle of claim 24, wherein each of said roller structures includes a pair of laterally separated rollers which define a guiding slot adapted for guidingly receiving said guide means' cooperating belt portion.

26. A heavy duty belt laying work vehicle comprising:

a) a frame having opposed lateral sides;

b) a pair of spaced apart wheel structures each having a radially outwardly facing outer peripheral surface and being rotatably connected on each lateral side of and in supporting relation to said frame, said each pair of wheel structures including a laterally rigid driver having a substantially constant circumference during rotation under load;

c) an endless, inextensible belt in circumscribing relation with each pair of wheel structures and having an interior surface and an elastomeric exterior surface which are respectively engageable with said wheel structures' outer peripheral surfaces and the underlying terrain;

d) means for controllably biasing each belt and its associated driver into frictional driven engagement, said biasing means including means for longitudinally separating the wheel structures of each pair;

e) means for rotating said drivers;

f) means for wiping debris from between the engageable justaposed surfaces of said driver and belt; and g) guiding means including interengaging portions of said wheel structures and belts for maintaining lateral registry of each belt and its associated wheel structures and for permitting lateral engagement therebetween which progresses inwardly from a radial location substantially adjacent said outer surfaces.

27. The belt laying work vehicle of claim 26, wherein said guiding means includes:

a plurality of discrete, longitudinally separated alignment members protruding interiorly of each belt's interior surface and each having a location surface; and a positioning surface disposed on each wheel structure laterally adjacent said location surfaces, said laterally adjacent surfaces diverging from said outer periphery to promote guiding engagement therebetween at said outer periphery.

28. The belt laying work vehicle of claim 26, wherein each belt includes:

a closed loop elastomeric body portion; and a flexible, inextensible filament structure longitudinally wound in and bonded to said body portion and having a plurality of laterally adjacent, longitudinal wraps which are each generally parallel to said frame's longitudinal axis when said belt is disposed bout said wheel structures.

29. The belt laying work vehicle of claim 28 wherein said laterally extreme longitudinal wraps of each belt reside laterally beyond said entrained driver's entire outer peripheral surface 30. The belt laying vehicle of claim 26 including:

means for distributing a predetermined fraction of the weight of said frame to the interior surface of each belt longitudinally between said wheel structures of each pair.

31. The belt laying vehicle of claim 30, wherein said weight distribution means includes:

a) a mounting structure connected to said frame;

b) a first and a second arm pivotally connected to said mounting structure about a pivot axis;

c) a first and a second roller structure being respectively rotatably joined to said first and second arms; and d) means for biasingly transmitting forces exerted on one of said arms by the roller structure joined thereto to the other roller structure through said other arm.

32. The belt laying vehicle of claim 31, wherein each of said roller structures includes:

a pair of laterally separated rollers which define a guiding slot adapted for guidingly receiving said guide means' cooperating belt portion.

33. A heavy duty belt laying work vehicle comprising:
a) a frame having opposed lateral sides;
b) a pair of spaced apart wheel structures each having a radially outwardly facing outer surface, said wheel structures being rotatably connected on each lateral side of an in supporting relation to said frame, each of said wheel structure pairs including a laterally rigid driver having a substantially constant circumference during rotation under load and a plurality of laterally extending grooves in said outer surface;
c) a pair of endless, inextensible belts each having an interior surface and being entrained about a respective pair of said wheel structures;
d) means for biasing each belt's interior surface into continuous frictional driven engagement with the associated driver's outer surface, said biasing means including means for longitudinally separating the wheel structures of each set;
e) means for rotating each of said drivers; and
f) guiding means including cooperating lateral surface portions of said wheel structures and belt for maintaining lateral alignment thereof and for providing lateral surface engagement therebetween which progresses inwardly from said outer surfaces with increasing relative lateral movement of said belts and associated drivers.

34. The belt laying work vehicle of claim 19, wherein said grooves define separating protuberances each having a pair of arcuately bounding edges.

35. The belt laying work vehicle of claim 34 wherein said edges include elastomeric material.

36. The belt laying work vehicle of claim 34 wherein said edges include metal material.

37. A heavy duty belt laying work vehicle comprising:
a) a frame having opposed lateral sides;
b) a pair of longitudinally separated wheel structures having radially outwardly facing outer peripheral surfaces and being mounted in supporting relation to said frame on each lateral side thereof and at least one of each pair including a driver;
c) a pair of endless, inextensible belts each being entrained about a respective pair of said wheel structures and including a body portion bounded by opposed interior and exterior surfaces and opposed lateral sides, said body portion having reinforcing structure disposed therein between said lateral sides, a plurality of laterally extending grooves being disposed on one of said interior surface and said outer peripheral surface of each belt and entrained driver, respectively;
d) means for controllably tensioning and urging each belt's interior surface and said outer peripheral surface of the associated driver in to frictional driven engagement, said tensioning means including means for longitudinally separating the wheel structures of each pair;
e) means for rotating each of said drivers; and
f) a plurality of longitudinally separated elastomeric alignment members joined to the interior surfaces laterally between the lateral extremes of said reinforcing structure, said alignment members being laterally engagement with said wheel structures.

38. The heavy duty belt laying work vehicle of claim 37 wherein each said alignment member has a locating surface and each wheel structure has a positioning surface which is disposable laterally adjacent said locating surface.

39. The heavy duty belt laying work vehicle of claim 38 wherein said laterally adjacent surfaces diverge from said interior surface.

40. The heavy duty belt laying work vehicle of claim 37 wherein said reinforcing structure of each belt includes an inextensible filament structure longitudinally wound in and bonded to said body portion.

41. The heavy duty belt laying work vehicle of claim 40 wherein said reinforcing structure of each belt includes a plurality of longitudinally separated, laterally extending reinforcing elements disposed exteriorly from said filament structure.

42. The heavy duty belt laying work vehicle of claim 40 wherein said filament structure defines a plurality of laterally separated wraps, said wraps adjacent said opposite lateral sides being disposed laterally beyond said entrained driver's entire outer peripheral surface.

43. A heavy duty belt laying work vehicle comprising:
a) a frame having opposed lateral sides;
b) two pairs of longitudinally separated wheel structures mounted in supporting relation to said frame and at least one of each pair including a driver having a substantially constant circumference during rotation under load and a radially outwardly facing peripheral surface;
c) an endless, inextensible belt entrained about each pair of wheel structures and each having interior and exterior surfaces which are respectively engageable with said peripheral surface and the underlying terrain, a plurality of laterally extending grooves being disposed on one of said interior surface and said outer peripheral surface of each belt and entrained driver, respectively, said one surface including elastomeric material and said grooves being separated by protuberances, aid protuberances having a ratio of arcuate length to radial height of not less than 1:1;
d) means for urging each interior surface into frictional driven engagement with said associated driver's outer peripheral surface, said urging means including means for longitudinally separating the wheel structures of each pair;
e) means for rotating said drivers; and
f) guiding means including interengaging portions of said wheel structures and entraining belt for initiating lateral engagement therebetween at locations adjacent said outer peripheral surface.

44. The heavy duty belt laying work vehicle of claim 43 wherein said ratio of protuberance arcuate length to radial height is not less than 3:1.

45. The heavy duty belt laying work vehicle of claim 43 wherein said grooves have an arcuate length no greater than the protuberance's arcuate length.

46. The heavy duty belt laying work vehicle of claim 43 wherein said radial height is at least ½ inch.

* * * * *